UNITED STATES PATENT OFFICE.

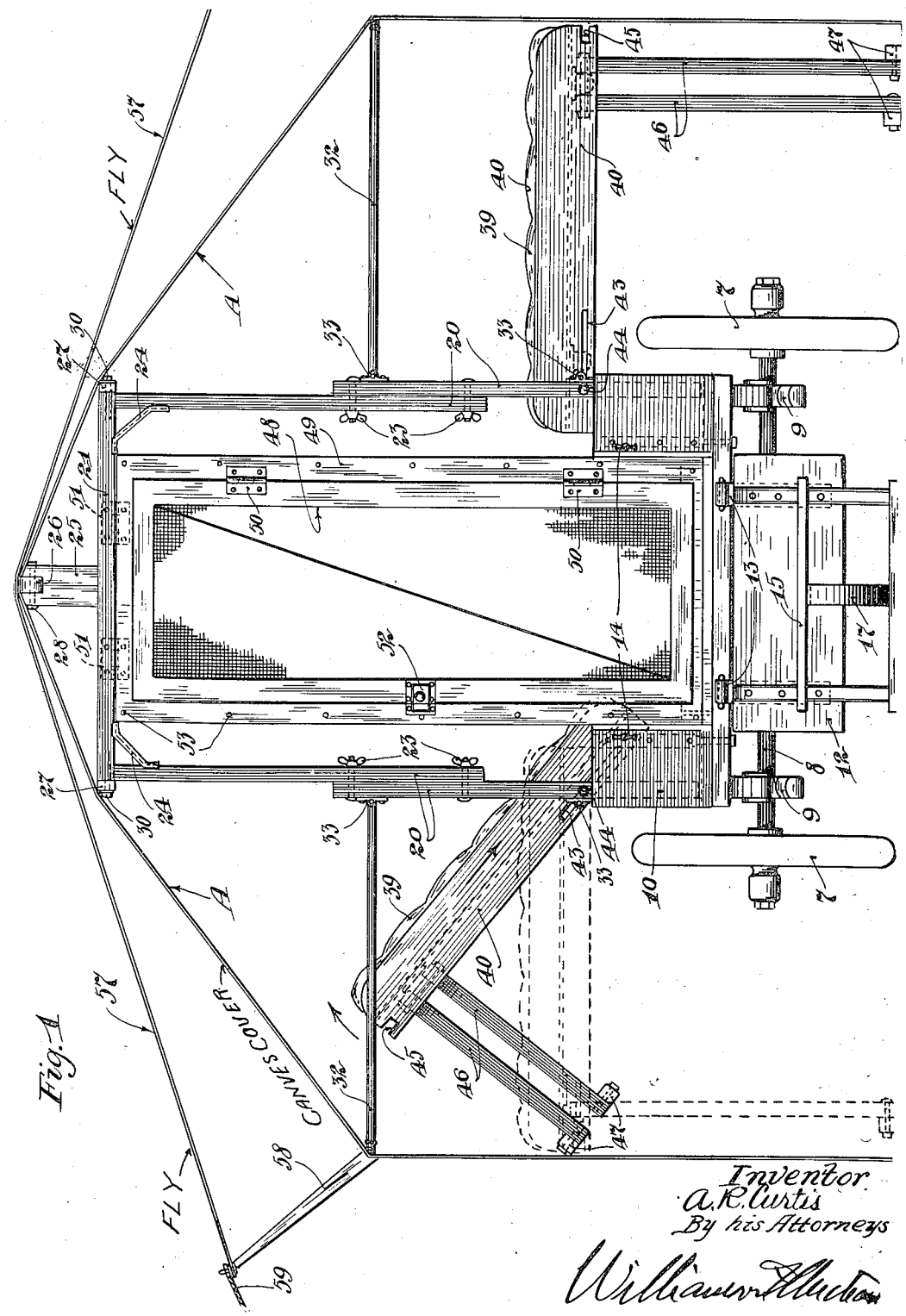

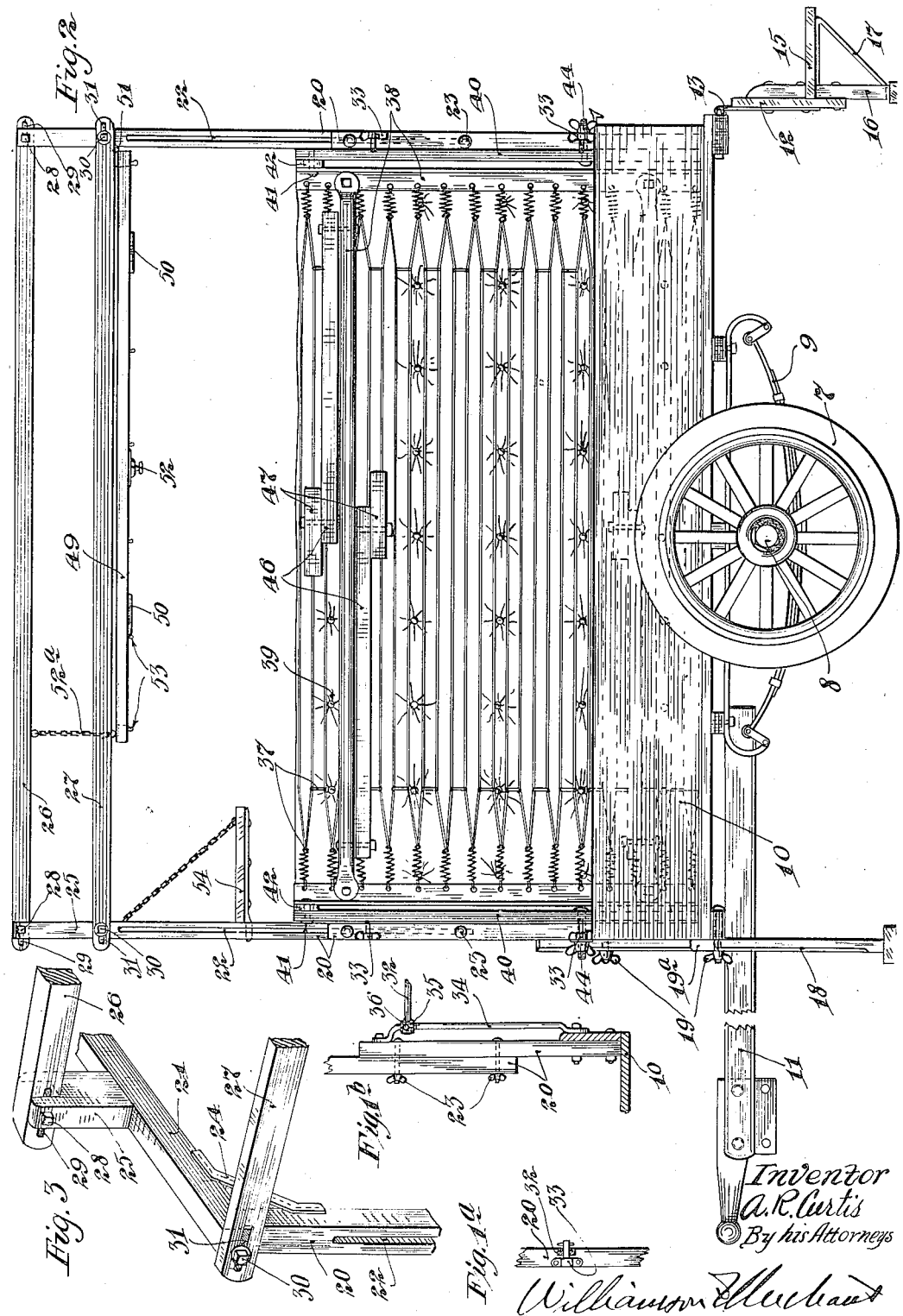

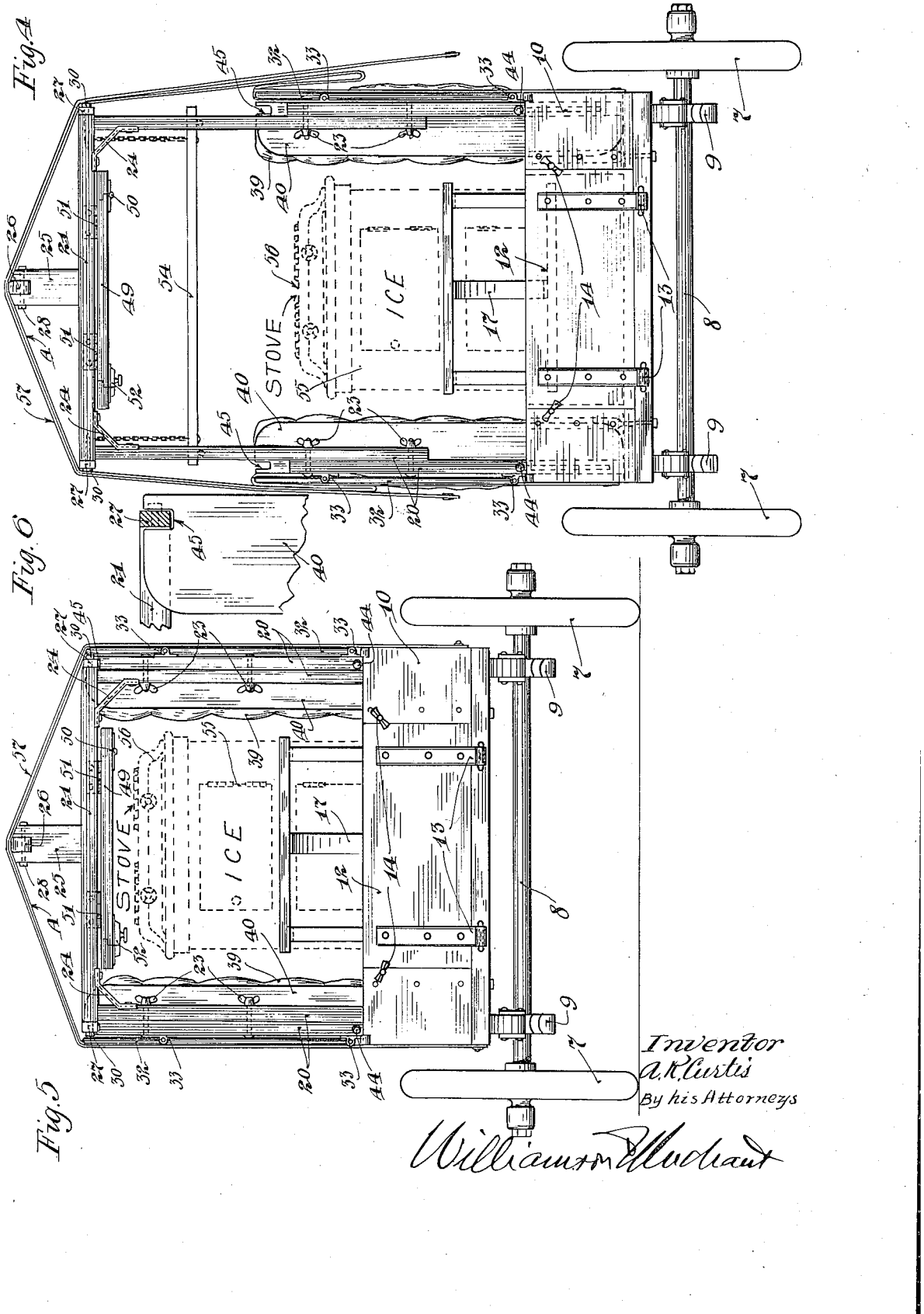

ALEXANDER R. CURTIS, OF MINNEAPOLIS, MINNESOTA.

CAMPING TRAILER.

1,407,259.   Specification of Letters Patent.   Patented Feb. 21, 1922.

Application filed July 11, 1919. Serial No. 310,115.

*To all whom it may concern:*

Be it known that I, ALEXANDER R. CURTIS, a citizen of the United States, residing at Minneapolis, in the county of Hennepin and State of Minnesota, have invented certain new and useful Improvements in Camping Trailers; and I do hereby declare the following to be a full, clear, and exact description of the invention, such as will enable others skilled in the art to which it appertains to make and use the same.

My invention relates to that type of trailer, usually designated as camping trailers, and which includes, not only suitable tent and equipment, but also various other devices necessary or useful in camping out.

Generally stated, the invention consists of the novel devices and combinations of devices hereinafter described and defined in the claims.

The invention is illustrated in the accompanying drawings, wherein like characters indicate like parts throughout the several views.

Referring to the drawings:

Fig. 1 is a rear elevation of the trailer, showing the beds and canvas extended and the right hand bed in extreme extended position, some portions being removed;

Fig. 2 is a side elevation of the trailer, with the tent or canvas removed therefrom;

Fig. 3 is a fragmentary perspective showing a portion of the upper frame work of the tent structure;

Fig. 4 is a rear elevation of the trailer showing the same with the tent and wings or sides folded but with the top in a raised position;

Fig. 5 is a view corresponding to Fig. 4 but showing the parts of the trailer folded or condensed as when the trailer tent is drawn behind an automobile;

Fig. 6 is a fragmentary detail view of a portion of the frame work of the truck structure;

Fig. 1ᵃ is a detail in side elevation showing a portion of one of the corner portions and one of the wing frame pivots; and Fig. 1ᵇ is a modification of the construction shown in Fig. 1ᵃ.

Of the parts of the trailer truck, the numeral 7 indicates the two wheels, the numeral 8 the rear axle, the numeral 9 the springs, the numeral 10 the box-like body, and the numeral 11 the pole or tongue, the latter being provided at its front end with a suitable coupling device for attachment to the automobile, but this coupling device need not here be provided for.

The box-like body 10, at its rear end, is provided with a tail board 12 connected thereto by strong hinges 13; this tailboard 12 extends less than from side to side of the truck or body tent and is adapted to be held in an upturned or closed position by turn buttons 14, or any other suitable device. A step board 15 is rigidly secured to and projects horizontally from the tail board 12, and that side thereof that is innermost when the tailboard is in a closed position, is outermost when the tailboard is dropped down into a vertical position. Legs 16 are rigidly secured to tail board 12 and are connected to the step board 15 by angle braces 17.

When the tail board is turned down, as shown in Figs. 1 and 2, the legs 16, at their lower end will engage with the ground and support the rear portion of the truck body.

Vertically adjustable front legs 18 are secured to the front board of the body 10, near the corners of the body, preferably, by means of nut-equipped bolts 19, anchored to the said box and working through vertical slot 19ᵃ in the said legs. These front legs 18 are adapted to be forced down until they engage the ground, irrespective of irregularities in the ground, and when engaged with the ground and secured, they will support the front end of the said body. Hence, by means of the wheel and the rear legs 16 and front legs 18, the box or body of the trailer may be very firmly supported.

For supporting the main canvas or cover A, immediately over the front of the truck, I provide front end and rear end frames, that are preferably made vertically adjustable. Each such end frame comprises vertically adjustable sectional corner posts 20 and cross tie bars 21. The lower ends of the lower sections of posts 20 are bolted, or otherwise rigidly secured to the box of the truck body, in the corners thereof. The sections of the said posts are made vertically adjustable, by slot 22 in the upper section, and by co-operative nut-equipped bolts 23, that work through the said slot and serve to clamp the post sections rigidly together.

The tie bars 21 are rigidly connected to the upper end of the co-operative upper section of the end frames, and preferably, the said connected parts are further connected by angle braces 24.

Secured on the central portions of the tie bars 21, are ridge blocks 25. The numeral 26 indicates a centrally located, longitudinally pivoted ridge pole and the numeral 27 indicates the so-called hip poles, that extend parallel to said ridge pole and are located one on each side thereof. The vertical adjustment of the end frames are important for two particular reasons, hereinafter noted.

The ridge pole 26, at its end, is connected to the ridge blocks 25, by bolts or pins 28 passed through the bifurcated upper ends of said blocks and through longitudinal slots 29 in the said ridge pole. The hip poles 27 are pivotally connected to the end of the frame tie bars 21, by large screws or bolts 30 that work through slots 31 in said poles 27 and are screwed into, or otherwise, secured to the ends of the said tie bar 21. The purpose of the slots in the pivotal connections between the poles 26 and 27 and their above noted supports will be hereinafter made clear.

The main canvas A is stretched over the ridge pole 26 and over the hip poles 27 and the sides thereof are brought outward to form a wing with depending portions.

To support these wings of the canvas A, I provide so-called wing frames, preferably made of iron pipe after the fashion of making awning supports. The front and rear parallel legs of these frames 32 are spaced to correspond to the distance between the front and rear posts of the front and rear end frames.

The pivotal connections between the inner ends of the arms of the wing frames 32 are vertically adjustable, and for this purpose they are provided with perforated ends that are adapted to be pivotally, but detachably engaged with studs 33 (see particularly Figs. 1 and 1ª). The upper studs 33 are secured to the upper portions of the lower corner post sections 20, and the lower studs 33 are secured to the lower portions of the same post sections. When the wing frames 32 are to be used to extend the wings of the canvas, as shown in Fig. 1, the perforated ends of the said frames are applied to the upper studs 33, but when the wings are to be folded, as shown in Figs. 4 and 5, the perforated ends of said frames are applied to the lower studs 33. This vertical adjustment of the wing frames may be also made by the modified means shown in Fig. 1ᵇ, wherein, vertical guide rods 34 are secured to the lower portions of the above noted post sections, and to the sides of the truck body 10. In this arrangement, the inner ends of the arms of the wing frames 32 are pivoted to sleeves 35 that move vertically on the guide rods 34 and are adapted to be locked thereon, either in upper or lower positions, by set screws 36.

The beds of this trailer are movable from vertical or folded positions shown in Figs. 4 and 5, into extended and operative positions shown in Fig. 1. Each bed comprises a bed spring 37 carried by a rectangular spring frame 38, and a mattress 39 carried by and suitably secured to the said spring. To each end of each spring frame 38 is secured an outwardly spaced end board 40. The end boards 40 are secured to end bars of the frame 38, preferably by bolts or rivets 41 and interposed spacing shims 42, by means of which latter, said end boards may be properly spaced into rectangular parallel arrangement, regardless of variations of the spring frame from true rectangular form. The end plates 40 should be so spaced that they will work freely between the front and rear corner posts 20. Near their ends, end boards 40 are provided with longitudinal slots 43, through which, and the lower sections of the corner posts 20, bolts or pins 44 are passed to afford sliding pivotal connections between the beds and truck body. At their free ends, the end boards 40 are provided with lock notches 45, which, when the beds are turned upward, into folded or inoperative position shown in Figs. 2 and 4, and the upper portions of the end frame are then dropped down to positions shown in Figs. 5 and 6, will be engaged by the so-called hip rails 27 (see particularly Fig. 6), and the said beds thereby locked to their said folded position.

Folding bed-supporting legs 46 are pivotally attached to the outer end portions of the spring frames 38. These legs 46 are provided at their lower ends with extensible foot pieces 47 which, when turned into engagement with the ground, will support the outer portions of the beds in horizontal positions.

As a highly important feature of this invention, I provide a screen door and door frame in a novel and important arrangement. This screen door is indicated as an entirety by the numeral 48, and the door frame, which is a rectangular door enclosing, or surrounding frame, is indicated by the numeral 49. The door 48 is connected to one side of frame 49 by hinges 50, and the door frame 49, at its top, is pivotally connected to the cross bar 21 of the rear frame, by means of hinges 51. A suitable latch 52 serves to latch the free edge of the door to the opposite side of the frame 49. Door frame 49 is of such vertical length that it will swing into vertical position when, and only when the rear corner posts 21 are vertically extended to their limit, as shown in Fig. 1; and when the said door frame is swung down to operative position stated, its lower portion will rest on the floor of the truck body 10 and will then positively hold said end frame in its raised or most extended position. When the end frames are lowered, or rather before they are lowered, door frame 49, together with the door 48, can be turned up into a horizontal inoperative position, just below the hip rails 27 and can then be secured in such position by any suitable fastening means, such as the hanger chain 52ᵃ shown in Fig. 2 as hung from the ridge pole 27 and hooked to the said frame 49.

The main canvas A will, of course, afford closures for the ends as well as for the sides of the tent structure, and at its rear end is adapted to be detachably attached to the door frame 49 by any suitable means, such as customary turn button fasteners 53. (See Fig. 1.) The numeral 54 indicates a folding shelf hung from the upper portion of the front frame 20—21. In Figs. 4 and 5, an ice box is indicated by the numeral 55, and an oil stove applied thereon, is indicated at 56, said parts being indicated by dotted lines only. These devices form no part of my present invention.

The numeral 57 indicates a "fly canvas" which may be applied in the usual, or any suitable way, may be spaced from the wing frames 32 by struts or arms 58 and anchored by ropes 59.

Fig. 1 shows the manner in which the tent is extended and the beds positioned for use. In this position of the parts, the beds are pulled out as far as they will go on their pivots, that is, as far as the slots 43 in the end boards or plates 40 will permit. In this extended position of the bed the inner portions project only slightly inward over the sides of the truck body 10, to wit, only far enough to cause the inner edges of the beds to afford good seats with wide isle space between in which a table, or the like, may be set in bad weather.

In this adjustment of the parts, of course, the screen door and its frame are in position, as shown in Fig. 1, with the door located to afford an entrance and exit just above the down-turned step 15.

When the tent is to be folded or condensed for transportation, as illustrated in Fig. 5, the beds are first turned into vertical positions and then slid vertically downward on their pivots until their lower edges strike the floor of the truck body, as shown in Fig. 4. Then the screen door and its frame are turned up to the position shown in Fig. 2, and there secured, as already described. Then the nuts or clamping bolts 23 being loosened, the upper sections of the end frames are dropped down to positions shown in Fig. 5, thereby causing the hip rails 27 to engage the notches 45 of end boards 40, and thereby lock the beds in their upturned positions. Then the ends of the wing frames 32 should be shifted from their upper to their lower pivots and turned upward, as shown in Fig. 5. This shifting and upturning of frames 32 may be either before or after the upper portions of the end frames have been dropped down.

Here it is important to note that the slots 31 in hip rails 27, and the slots 29 in ridge pole 26 permit the top portions of the front and rear frames to be dropped down at different times, or to be raised at different times, without springing or binding any of the parts. This makes it possible for one person to attend to the raising and lowering of the front and rear frames, performing said operations at different times, or one after the other, rather than simultaneously, which such simultaneous operation would require two persons. When the trailer is adjusted as shown in Fig. 5, its top is much lower than when extended for use and this makes the trailer a less cumbersome looking vehicle and one that will be less subject to wind pressure, but, nevertheless, affords a large carrying space within the trailer. The canvas cover is fastened down over the collapsed structure.

What I claim is:

1. A trailer comprising a truck, a canvas and canvas supporting frame, the latter being carried by the truck, in combination with beds connected to said frame for pivotal and sliding movements, the said sliding pivotal connections between said frame and beds permitting said beds to be dropped down into the body of said truck when turned into vertical position, the said frame having parts adapted to be dropped and to interlock with said beds to hold the same in upturned inoperative positions.

2. A trailer comprising a truck, a covering canvas and canvas supporting frames carried by said truck having vertically movable upper side and transverse portions, and beds pivotally connected to said frames movable into upturned inoperative positions and provided with securing means, the vertical adjustable portions of said frames being movable downwardly into contact with said beds and having means thereon engageable with the said securing means on the upturned beds to hold the same in upturned position.

3. A trailer comprising a truck, a covering canvas, front and rear canvas supporting frames carried by said truck, a screen door frame hinged to the upper portion of one of said supporting frames and adapted to be swung from a vertical operative to an upturned inoperative position, and a screen door hinged in said door frame and movable therewith from operative to inoperative positions.

4. In a trailer, the combination with a truck and a covering canvas, of front and rear canvas supporting frames carried by said truck and having vertically adjustable upper portions, and a ridge pole connected to said front and rear frames by slot and pin connections, as and for the purposes set forth.

5. In a trailer, the combination with a truck and a covering canvas, of front and rear canvas supporting frames carried by said truck and having vertically adjustable upper portions, and a ridge pole and laterally spaced hip poles connected to the vertically adjustable upper portions of said end frames by slot and pin connections, as and for the purposes set forth.

6. In a trailer, the combination with a truck, of a covering canvas, canvas supporting front and rear end frames having vertically adjustable upper portions, and wing frames connected to said end frames by pivots that are shiftable from upper to lower positions.

In testimony whereof I affix my signature in presence of two witnesses.

ALEXANDER R. CURTIS.

Witnesses:
CLARA DEMAREST,
F. D. MERCHANT.